US008203925B2

United States Patent
Knittel et al.

(10) Patent No.: US 8,203,925 B2
(45) Date of Patent: Jun. 19, 2012

(54) APPARATUS FOR RECORDING ANGULAR MULTIPLEXED PITS

(75) Inventors: Joachim Knittel, Villingen-Schwenningen (DE); Hartmut Richter, Villingen-Schwenningen (DE); Stephan Knappmann, Zimmern ob Rottweil (DE)

(73) Assignee: Thomson Licsensing, Boulogne-Billancourt (FR)

( * ) Notice: Subject to any disclaimer, the term of this patent is extended or adjusted under 35 U.S.C. 154(b) by 645 days.

(21) Appl. No.: 11/288,565

(22) Filed: Nov. 29, 2005

(65) Prior Publication Data

US 2006/0120257 A1 Jun. 8, 2006

(30) Foreign Application Priority Data

Dec. 2, 2004 (EP) .................................... 04028544

(51) Int. Cl.
*G11B 7/00* (2006.01)
(52) U.S. Cl. ............................. 369/112.02; 369/124.09
(58) Field of Classification Search ........................ None
See application file for complete search history.

(56) References Cited

U.S. PATENT DOCUMENTS 5,329,517 A * 7/1994 Yamaguchi et al. ..... 369/110.04
5,886,964 A * 3/1999 Fujita ...................... 369/112.17
5,914,923 A * 6/1999 Araki et al. ................ 369/44.32
6,151,154 A * 11/2000 Ogasawara et al. ........... 359/279
7,154,837 B2 * 12/2006 Kasazumi et al. ....... 369/112.02
7,688,685 B1 * 3/2010 Nemoto et al. ............ 369/13.54

FOREIGN PATENT DOCUMENTS

| | | | |
|---|---|---|---|
| EP | 0376673 | A2 | 7/1990 |
| EP | 0633565 | A1 | 1/1995 |
| EP | 1063645 | A2 | 12/2000 |
| JP | 07287860 | A * | 10/1995 |
| JP | 09-120538 | A | 5/1997 |
| JP | 2000268390 | A * | 9/2000 |
| WO | WO2004/059628 | A1 | 7/2004 |

OTHER PUBLICATIONS

Patent Abstracts of Japan, vol. 016,No. 216 (P-1356), May 21, 1992—& JP 04 038720 A (Olympus Optical Co Ltd), Feb. 7, 1992.
"DVD Disks Shine from All Angles", Physics World, Bristol, GB, Nov. 2004, p. 3, XP008047793.
'Online! XP002329755, Retrieved from the Internet: URL:http://physicsweb.org/articles/news/8/10/1/1>'retrieved on May 27, 2005!.

* cited by examiner

*Primary Examiner* — Paul Huber
(74) *Attorney, Agent, or Firm* — Robert D. Shedd; Patricia A. Verlangieri

(57) ABSTRACT

An apparatus for recording angular multiplexed pits on optical recording media using a device for generating a light beam with an asymmetric intensity distribution is described. The device for generating a light beam with an asymmetric intensity distribution has at least one light influencing part for introducing a phase shift of 180° in a first half of the light beam relative to the second half of the light beam, wherein the border between the first half of the light beam and the second half of the light beam is rotatable around an optical axis of the light beam.

6 Claims, 1 Drawing Sheet

1
18 17 16 15 14 13 12 11 10 25 24 23 22 21 20 19

APPARATUS FOR RECORDING ANGULAR MULTIPLEXED PITS

FIELD OF THE INVENTION

The present invention relates to an apparatus for recording angular multiplexed pits on optical recording media using a device for generating a light beam with an asymmetric intensity distribution.

BACKGROUND OF THE INVENTION

A well-known method to increase the storage capacity of optical recording media is to use a pit-substructure, e.g. the angular position of periodically aligned pits. This technology allows the storage of several bits of information in a single pit. Different pit shapes have been proposed to generate detectable angular signals, e.g. pits with one or more steps in depth, rotated "long pits", rotated "double-pits", etc. For example, in "*DVD disks shine from all angles*, Physics World November 2004", pits having an angular substructure in the form of a step being placed at one of 332 different angles is described. Illuminating non-rotational symmetric, reflective pit structures on a disk with a focused laser beam results in a non-rotational symmetric image on the detector. By using a special detector structure, it is possible to detect the angular substructure of the pits on the recording medium and to retrieve the stored information.

SUMMARY OF THE INVENTION

It is an object of the invention to propose an apparatus for efficiently recording angular multiplexed pits on optical recording media, and for mastering ROM recording media with angular multiplexed pits.

According to the invention, this object is achieved by an apparatus for recording angular multiplexed pits on optical recording media, including a device for generating a recording light beam with an asymmetric intensity distribution, which has at least one light influencing part for introducing a phase shift of 180 degrees in a first half of the light beam relative to the second half of the light beam, the border between the first half of the light beam and the second half of the light beam being rotatable around an optical axis of the light beam. By introducing a device for generating a recording light beam with an asymmetric intensity, e.g. a diffractive optical element, in front of the objective lens of a conventional laser recording system, an asymmetric intensity distribution is obtained in the focus of the objective lens. This leads to the generation of asymmetric pits. By rotating the border between the first half of the light beam and the second half of the light beam the asymmetric spot shape also rotates, which allows to record the pits at different angles.

For a practical recording system it is advantageous if the rotation is achieved in a very short time and preferentially without any mechanical movement. This is achieved with a liquid crystal (LC) element having electrodes that are arranged like the slices of a pie, i.e. like segments of a circle. By applying a certain voltage to a segment, the transmitted light beam experiences a phase shift of 180°. By applying the voltage to several segments simultaneously, the phase shift can be applied to exactly one half of the light beam. The number of segments in this case determines the number of possible recording angles. By applying the same (including zero) voltage to all segments, an optical pickup using this element is compatible with regular systems for optical recording media.

Preferably, the LC element is arranged in a reflective mode. In this case the light beam passes the LC element twice and the thickness of the LC layer can be reduced by a factor of two. This reduces the switching time of the LC element. In combination with ferroelectric liquid crystals switching times in the microsecond range are achieved.

For mastering a read-only optical recording medium with angular multiplexed pits with the apparatus according to the invention, it is necessary to illuminate the photoresist for each pit individually. To minimize the time for mastering, it is advantageous to be able to rotate the master with a constant speed. In this case a pulsed laser system, e.g. a pulsed diode laser, is favorably employed to avoid blurring of the pit structure.

A similar solution can also be used to directly write angular multiplexed pits on a write-once or a rewritable optical recording medium. The recording layer of the optical recording medium preferably consists of a phase-change medium, an organic dye or a photopolymer.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
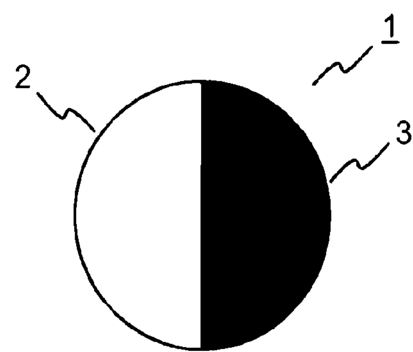
FIG. 1 depicts a device according to the invention for generating a light beam with an asymmetric intensity distribution, FIG. 2 schematically shows an intensity distribution in the focus spot generated with the device of FIG. 1.
Figure 2:
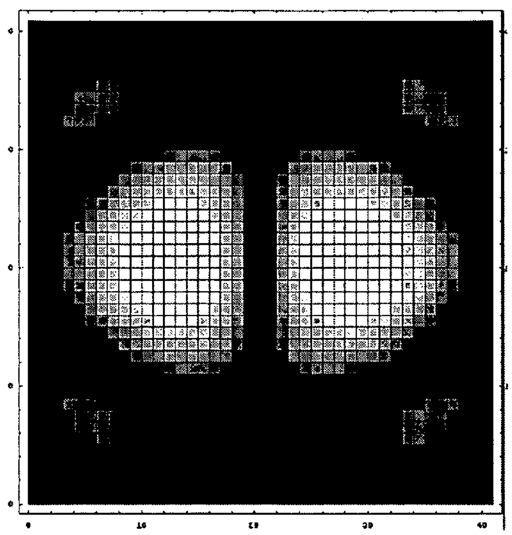

In FIG. 1 a device 1 according to the invention for generating a light beam with an asymmetric intensity distribution is shown. Such a device is preferably used in an apparatus for recording angular multiplexed pits on optical recording media. The device 1 is a diffractive optical element having a first half 2 and a second half 3. It introduces a phase shift of 180 degrees ($\pi$) in that part of a light beam which passes through the second half 3 relative to that part of the light beam which passes through the first half 2. The border between the first half 2 and the second half 3 advantageously runs through the center of the light beam, i.e. essentially one half of the light beam passes through the first half of the diffractive optical element 1, while the second half of the light beam passes through the second half 3. In this case, if the light beam is focused, in the focus spot the intensity distribution as depicted in FIG. 2 is generated. As can be seen, an asymmetric intensity distribution is obtained. This intensity distribution allows to record an asymmetric pit on the recording medium. By rotating the diffractive optical element the asymmetric spot shape also rotates, which allows to record the pits at different angles.

Figure 3:
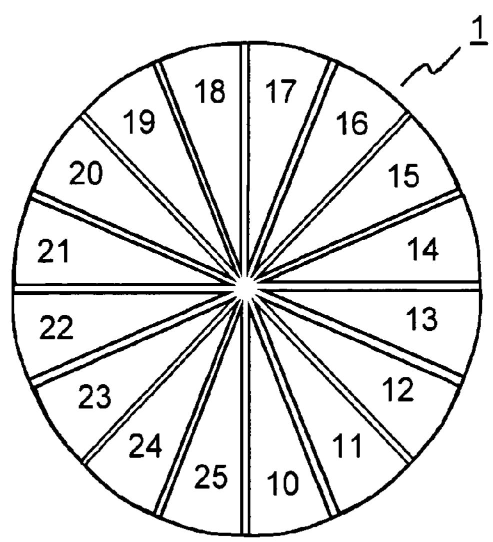
FIG. 3 illustrates the electrode structure of a liquid crystal element according to the invention.

As preferably there is no mechanical movement of the diffractive optical element, the diffractive optical element is approximated by a liquid crystal element as shown in FIG. 3. The liquid crystal element has electrodes 10-25 that are arranged like the segments of a circle. By applying a voltage to all segments from number 10 to number 17, one half of the light beam is influenced by the LC-element. By applying the voltage to the segments 11 to 18, the phase shift structure is rotated by one segment. The number of possible recording angles of the pits is determined by the number of segments. Instead of the segmented liquid crystal element a diffractive optical element with segments of an electro-optical material can also be used. In this case the electro-optical material changes the optical path length when a voltage is applied.

What is claimed is:

1. Apparatus for recording angular multiplexed pits on an optical recording medium, wherein a rotation angle of an angular multiplexed pit represents several bits of information, wherein the apparatus is configured to perform the steps of:

introducing a phase shift of 180 degrees in a first half of the recording light beam relative to a second half of the recording light beam with a liquid crystal element comprising electrodes that are sectors of a circle;

setting an orientation of a border between the first half of the recording light beam and the second half of the recording light beam relative to an optical axis of the recording light beam to a first orientation of at least two different orientations in accordance with a rotation angle of a first pit to be recorded;

recording the first pit on the optical recording medium by illuminating the optical recording medium with the recording light beam;

setting the orientation of the border between the first half of the recording light beam and the second half of the recording light beam relative to the optical axis of the recording light beam to a second orientation different from said first orientation in accordance with a rotation angle of a second pit to be recorded; and recording the second pit on the optical recording medium by illuminating the optical recording medium with the recording light beam;

wherein the orientation of the border between the first half of the recording light beam and the second half of the recording light beam is set by selectively applying a voltage to one half of the electrodes of the liquid crystal element.

2. Apparatus according to claim 1, wherein the liquid crystal element is used in a reflective mode.

3. Apparatus according to claim 1, wherein the recording light beam is a pulsed light beam.

4. A method for recording angular multiplexed pits on an optical recording medium with a recording light beam with an asymmetric intensity distribution, wherein a rotation angle of an angular multiplexed pit represents several bits of information, the method comprising the steps of:

introducing a phase shift of 180 degrees in a first half of the recording light beam relative to a second half of the recording light beam with a liquid crystal element having electrodes that are sectors of a circle;

setting an orientation of a border between the first half of the recording light beam and the second half of the recording light beam relative to an optical axis of the recording light beam to a first orientation of at least two different orientations in accordance with a rotation angle of a first pit to be recorded;

recording the first pit on the optical recording medium by illuminating the optical recording medium with the recording light beam;

setting the orientation of the border between the first half of the recording light beam and the second half of the recording light beam relative to the optical axis of the recording light beam to a second orientation different from said first orientation in accordance with a rotation angle of a second pit to be recorded; and recording the second pit on the optical recording medium by illuminating the optical recording medium with the recording light beam;

wherein the orientation of the border between the first half of the recording light beam and the second half of the recording light beam is set by selectively applying a voltage to one half of the electrodes of the liquid crystal element.

5. Method according to claim 4, wherein the liquid crystal element is used in a reflective mode.

6. Method according to claim 4, wherein the recording light beam is a pulsed light beam.

* * * * *